United States Patent Office 3,219,047
Patented Nov. 23, 1965

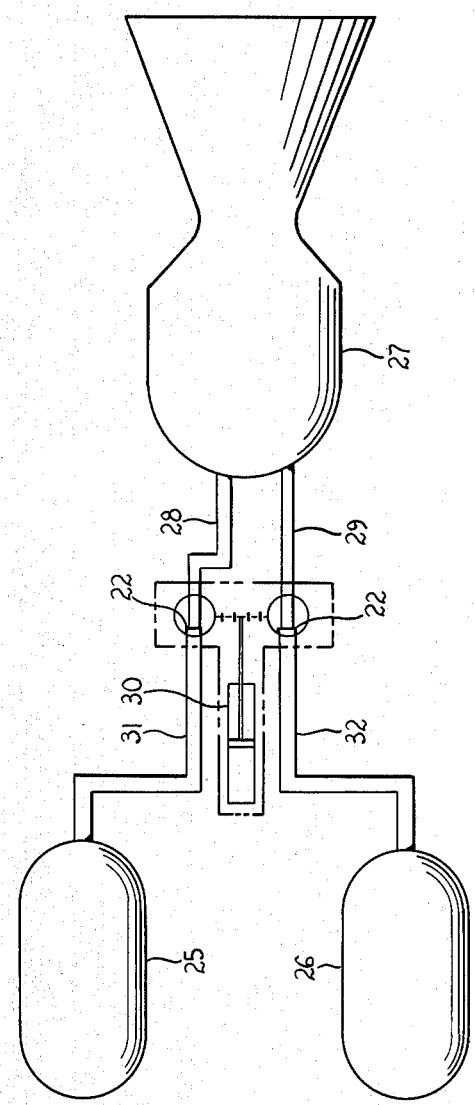

3,219,047
ROTATABLE BALL VALVE ASSEMBLY HAVING AN INLET SHEAR CUP
Hartmann J. Kircher III, Sparta, and Lloyd W. Goldberg, Clifton, N.J., assignors to Thiokol Chemical Corporation, Bristol, Pa., a corporation of Delaware
Filed June 1, 1962, Ser. No. 199,391
1 Claim. (Cl. 137—68)

This invention relates to rotating spherical element, or "ball" valves, and more particularly to an improvement in such valves wherein the ball, which contains a passageway to permit the flow of fluid therethrough, is rotated to bring the passageway into registration with inlet and outlet ports in the valve body.

In the usual device of this sort the ball is fitted with a slot which receives the end of a rotating rod or crank. The crank extends exteriorly of the valve and is rotatably propelled by suitable actuation means. The ball thus rotated has the passageway therein brought into registration with the valve inlet and outlet, and by suitably controlling the rotational speed thereof, the valve may be utilized as a fluid metering and control device. It thus finds widespread use in fluid systems of every description.

Sealing of these valves is accomplished in most instances by a seat of resilient material of generally annular or circular form fixed to the valve body. The annular seat is usually in contact with the body of the ball and shaped to cradle it therein. In addition, it is biased against the ball by a spring, fluid pressure, or other biasing means well known in the art. As the ball is rotated the heal is constantly in contact with the outer periphery thereof.

However, while such sealing devices are adequate during operation of the valve under normal use and in ordinary fluids, there is no provision for isolating the internal portions of the valve from fluids which might be corrosive; especially during long term storage. As an example, under certain conditions and uses e.g., fire fighting sprinkler systems, rocket motor stand-by systems, aircraft escape systems and the like, the valve internal parts experience "soaking" in the fluid to be controlled (unless a separate fluid control device is used to prevent this) which would in time corrosively damage these parts and interfere with proper operation of the valve.

It is therefore the object of this invention to create an improvement in valves of this type wherein the internal parts are isolated from the fluid to be controlled during storage without interfering with its normal operating function. This is accomplished by providing in the inlet thereof a hermetic barrier which is simultaneously affixed to the valve body and to the spherical element or ball.

Other objects of the invention will become apparent from the following description and claim and illustrated in the accompanying drawings which disclose a preferred manner of applying its principle.

In the drawings:

FIGURE 2 is a schematic diagram of a fluid system such as commonly found in the rocket engine liquid propellant art wherein a pair of valves in accordance with the invention are utilized to control the propellants entering the combustion chamber thereof.

Figure 1:
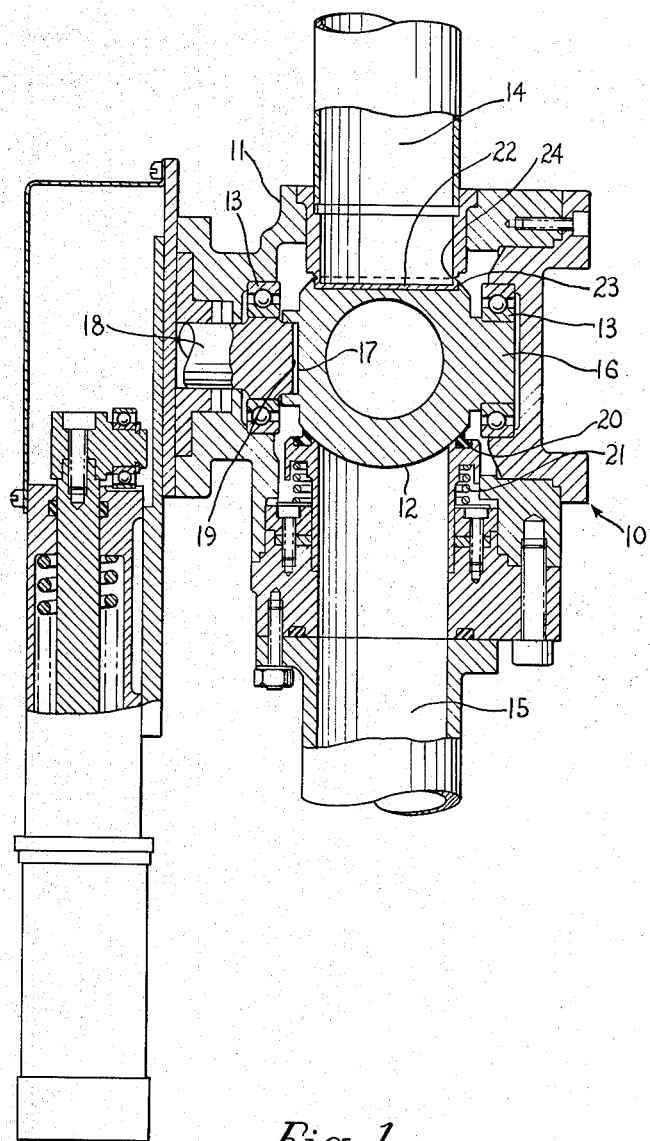
FIGURE 1 is a sectional view of the invention, including a means for causing rotation of the spherical element, with the valve in the closed and "hermetically" sealed position.

Referring to the drawings there is shown a valve 10 having a body 11, a generally spherical element or ball 12 having a fluid passageway therethrough, bearing assemblies 13, inlet port 14 and outlet port 15. The ball 12 has a protuberance 16 of generally cylindrical shape at one side thereof which is supported in one of the bearing assemblies 13. Opposite thereto is a slot 17 in ball 12 for reception of a crank or rotating rod 18 having a suitably formed end 19 for engaging with slot 17. Crank or rod 18 is supported in the other of the two bearing assemblies 13.

In the outlet port 15 is an annular seal 20 which is slidably affixed to body 11 and urged against ball 12 by spring 21. Oppositely placed to seal 20 is a hermetic seal 22, which is comprised of a shearable cup-like form positioned on the ball in recess 23 therein and affixed by welding, brazing or soldering. At the same time it is affixed to the body 11 in the inlet 14. Hermetic seal or shear cup 22 has a preformed undercut 24 for ease and precision of shearing action during operation of the invention. Undercut 24 is usually necessary only if seal 22 is to be fabricated of a metal such as stainless steel, aluminum or copper and the like or other shear resistant material.

Referring to FIGURE 2 there is shown in schematic form a fluid system such as commonly encountered in the liquid propellant rocket art and in which the invention herein described finds exceptional use. In the system shown, two fluids, one a fuel such as alcohol, kerosene or the like, and the other, an oxidizer, such as nitric acid, liquid oxygen, or the like are stored in tanks 25, and 26, respectively. In many instances it is highly desirable or even necessary to store such systems in packaged form, completely loaded with propellants for periods of up to a year and longer. In such use it is highly desirable to effectively separate the down stream portions of the system (FIGURE 2), wherein a rocket combustion chamber 27 is illustrated with fluid conducting pipes or conduits 28 and 29 emanating from shut-off valve 10. The capability of storing fluid systems for long-terms is oftentimes dependent upon the ability of the valve positioned between the two sections of the system to prevent upstream fluid from leaking past the valve and entering the combustion chamber. Such fluids are usually highly corrosive and cause deterioration of the interior working parts since they cannot always be made of corrosion resistant materials. Pipes 28, 29, 31 and 32, however, can easily be made of suitable material such as the many stainless steels or other more exotic metals which can withstand such corrosive action, whereas to so fabricate a relatively complex mechanism with movable parts such as valve 10, which has the capability of withstanding saturation with corrosive fluids, and at the same time can perform as desired one or two years hence when called upon to do so is difficult if not impractical. Hence, it is manifestly necessary to prevent absolutely any fluid leakage into the valve where corrosion of the several internal parts can take place as is the case in devices available prior to the invention herein described. Shear cups 22 (FIGURE 2) provide such a seal and prevent leakage of corrosive fluids into the valve where corrosive damage can occur. Attachment of the shear cups 22 as shown in FIGURE 1, and again schematically in FIGURE 2, by welding, brazing or other suitable methods to both the valve body 11 and the actuated spherical element or ball 12, provide the desired absolute separation of the fluid from the interior portions of valve 10.

Having thus provided for the prevention of leakage of fluid from tanks 25 and/or 26 to the interior of the valve 10 and its resulting disastrous corrosive action on the parts therein, there remains only the necessity of providing for a means for instantaneous removal of this hermetic seal or shear cup 22 upon demand, as when the liquid propellant rocket engine system is called upon to operate. This again is a unique feature of the invention herein described, as this capability is provided by the novel use of shearable seals or members 22. It is seen that when the ball 12 is rotated by means of the crank 18 which is acted upon by the actuator 30, shear cups 22 break and simultaneously the ball 12 is rotated to its position of registration with inlet 14, outlet 15 and the passageway in the ball to permit full fluid flow therethrough.

Having thus described the invention and its operation it will be understood that it is to be limited in scope in the practice thereof only by the foregoing specification and the scope of the subtended claim.

What is claimed is:

In combination, a conduit for the flow of explosives, corrosive fluids from storage to a place of utility requiring the non-leaking metering of such flow upon commencement thereof, a metering valve rotatably mounted in said conduit to seal said fluids therein during storage and to initiate metered flow thereof to the point of utilization, said valve comprising a ball valve having a fluid flow passage therethrough alignable in varying degrees with said conduit for metering of the fluid therethrough and movable to a valve closed position in which said ball valve arrests fluid flow therethrough, a cup-shaped recess formed in a side of said ball valve in alignment with the valve inlet side of said conduit in the valve closed position, a cup-shaped frangible hermetic seal seated in said valve recess and supported by and sealed to both said valve and said conduit to prevent leakage of said fluid and corrosion of said valve during storage of said fluid, means for rotating said ball valve to shear said hermetic seal and align said flow passage to initiate metered flow of said fluids through said ball valve, and a spring pressed seal acting against the down stream side of said ball valve to eliminate leakage of the fluid at the downstream seal engaging surfaces of said ball valve, externally of said valve during flow of said fluid, and accurate metering thereof.

References Cited by the Examiner
UNITED STATES PATENTS

| | | | |
|---|---|---|---|
| 2,365,364 | 12/1944 | Temple | 137—68 |
| 2,839,074 | 6/1958 | Kaiser | 251—174 X |
| 2,963,260 | 12/1960 | Siravo | 251—174 X |
| 3,039,482 | 6/1962 | Goldberg | 137—68 |
| 3,093,151 | 6/1963 | Merkowitz | 137—68 |
| 3,097,482 | 7/1963 | Lovingham | 137—68 XR |
| 3,111,133 | 11/1963 | Fulton | 137—68 |

ISADOR WEIL, *Primary Examiner.*

M. CARY NELSON, *Examiner.*